June 9, 1931.　　　　H. R. BRAND　　　　1,809,157
REGISTERING DEVICE AND ANNUNCIATOR
Filed March 3, 1921　　　7 Sheets-Sheet 1

Inventor
Harry Russell Brand
By E. H. Bond
Attorney

June 9, 1931.  H. R. BRAND  1,809,157
REGISTERING DEVICE AND ANNUNCIATOR
Filed March 3, 1921  7 Sheets-Sheet 3

Inventor
*Harry Russell Brand*

By *E. H. Bond*
Attorney

June 9, 1931.  H. R. BRAND  1,809,157
REGISTERING DEVICE AND ANNUNCIATOR
Filed March 3, 1921  7 Sheets-Sheet 6

Inventor
Harry Russell Brand
By E. W. Bond
Attorney

Patented June 9, 1931

1,809,157

UNITED STATES PATENT OFFICE

HARRY RUSSELL BRAND, OF NEW YORK, N. Y.

REGISTERING DEVICE AND ANNUNCIATOR

Application filed March 3, 1921. Serial No. 449,560.

This invention relates to certain new and useful improvements in annunciators or registering devices and it has for its object, among others, to provide an improved form of device of this general character being adapted peculiarly for use primarily in connection with commodity control mechanisms, being intended in a general way to constitute one of the units or accessories of a series of devices which form the subject matter of various applications now pending or soon to be filed constituting what may be termed a system of automatic accounting, for use in hotels, restaurants and various other forms of commodity handling devices or arts.

One of the primary objects of the invention is to provide simple and efficient yet absolutely reliable means for registering accumulated items in successive steps and providing visual registrations, as well as providing for making deductions from such accumulations when necessary or desired.

The device is intended to be employed as an indicating order device operable in the main by a controller, such for example as that shown and described in my copending application, Ser. No. 283,817 (which is one of said copending applications and has since eventuated in Patent #1,682,827, issued September 4, 1928), one of whose functions is to cause a step forward of the registering means each time such controller is operated, and to be controlled independently by other means, both automatic and manual to cause deductions to be made from the accumulations obtained by the former control.

For example in connection with the commodity control, say, in a food control system, the manual control is operable by the attendant. For instance, the chef in the kitchen has had an order from the dining room through my improved annunciator or recording-device for a certain portion of food. One of the visual signals or indicators keeps him advised that such order is yet unfilled or unprepared. When the chef has noted the order to be filled, or has filled the order, the visual indicator is returned to normalcy by actuation of a push button or switch. The automatic means is operable only by the insertion of a token designed for that purpose, such as is issued from the controller shown and described in my copending application Ser. No. 283,817, filed March 20, 1919.

The other visual indicator is arranged to be automatically actuated by the controller (the mechanism and means for effecting this being shown and described in my said copending application Ser. No. 283,817) and is not similarly returned to normalcy, although in the advance the two move in unison. The last named is stepped back one digit only at a time by the introduction of a token.

Shown more in detail, in my said copending application Ser. No. 283,817, a commodity-demanding token is issued from an inaccessible magazine, a record of the issuance of the token and of the identity of the seller being made inaccessible within the machine. The commodity-demanding token so issued and recorded must then be inserted or deposited to step back the indicator of this present case, indicating the surrender or supply of the commondity unit for which the token was surrendered, as just precedingly explained.

That is, in a restaurant for example, the waiter by operating the automatic controller of application Ser. No. 283,817 aforesaid, obtained a commodity-demanding token, at the same time making inaccessible within the controller a record of the transaction and of his own identity and also registering the order in one of the devices of that application, which device is the mechanism or machine of the present application. To remove the registration made in the present machine by the actuation of the automatic controller the indicator must be stepped back one unit by the deposit of the before-mentioned token. That is, in the particular case, the waiter to obtain the commodity to deliver to the guest must secure the token, thereby making an inaccessible record of the transaction and of his identity, and at the same time making an inaccessible charge against the cook. The waiter must surrender the token to the cook to secure the commodity and the cook in turn must deposit the token to remove the inaccessible charge made against him by the waiter.

Other objects and advantages of the invention will hereinafter appear and the novel features thereof will be particularly pointed out in the appended claims.

The invention, in its preferred form, is clearly illustrated in the accompanying drawings which, with the numerals of reference marked thereon, form a part of this specification, and in which

Figure 5 is an elevation from the left side of the machine, with parts removed—

Figure 6 is a sectional elevation on line 6—6 of Figure 1 with parts removed—

Like numerals of reference indicate like parts throughout the several views.

Referring now in detail to the particular embodiment of the invention, illustrated by way of example in the accompanying drawings, and referring first to the general structure:

As illustrated the machine consists of a base 1 supporting front and rear plates 2 and 3 respectively, rigidly held at their upper portions by a rod 4. Plate 2 is attached to base by brackets 5 and the plate 3 is fastened to brackets 48 and 49 attached to the base 1.

6 is a face plate attached to the front plate, openings 7 and 8 in the plate 6 corresponding to similar openings in the plate 2, and there is a slotted support 9 for holding the distinguishing card 10.

Means are provided for making two separate registrations of the transaction (such as a commodity sale, a dish ordered by a guest in a restaurant being an example) and for independently eliminating or stepping back the two registrations so made, one at the will of the commodity supplier (such as the cook) and the other by the deposit of the token already described. In the embodied form these two means are combined, or cooperate together, and comprise a bracket 11 mounted on the base 1 which has rigidly attached thereto and centered thereon the rod 12. Rotatably mounted on the rod 12 is a sleeve 13 which has fixed thereto and as a part thereof the toothed wheel 14 substantially midway of its length. The wheel 14 has ten teeth corresponding to the ten digits. The sleeve 13 is provided with a keyway 15 arranged parallel with its axis. The foregoing is a part of the mechanism for making the two registrations of the transactions.

As a part of the embodied means for separately or independently stepping back or eradicating the two registrations, slidably mounted on the sleeve 13 are toothed wheels 16 and 17 the hubs of which are each provided with annular grooves 18 and 19 respectively. The teeth on the wheels 16 and 17 are each in number equal to those on the wheel 14. Splines 20 and 21 are so fixed in the hub of the wheels 16 and 17 respectively as to co-act with the keyway 15, so as to permit both rotation of the wheels 16 and 17 with the sleeve 13 and travel along its axis.

In the embodied form of transaction-registering mechanism, the transactions are counted or stored on numbered disc wheels or drums, and in said embodied form, freely mounted on the sleeve 13 at one end is a drum 22 and on the other end a drum 23. Each drum has arranged on its periphery numerals representing the digits 0 to 9 inclusive, and equally spaced. The drum 22 is the one which is stepped back at the will of the supply source (which may be the cook) and the drum 23 is stepped back only by the deposit of the commodity-demanding token which was issued from the controller of my application Ser. No. 283,817.

Projections 24 and 25 are suitably shaped and arranged on the drum 22 to co-act with the wheel 16 for driving the drum in one direction and permitting a step-by-step return in the opposite direction as will be hereinafter described.

Similarly, projections 26 and 27 in the drum 23 are adapted for action with the toothed wheel 17.

Bushings 28 and 29, mounted on either end of the rod 12 and embraced respectively by the drums 22 and 23, carry pins 30 and 31 respectively; the pin 30 is adapted to hold one end of the spring 32 the other end of which is attached to a pin 33 fixed in the web of the drum 22. Similarly a pin 31 holds one end of the spring 34, the other end being attached to a pin 35 fixed in the web of the drum 23. Both springs are so arranged as to tend to drive the drums in a direction opposite to their advance by other means. A plate 36 is attached to the drum 22 in such a manner as to retain the spring within the drums, and a plate 37 is similarly attached to the drum 23 for the same purpose.

Figure 1:
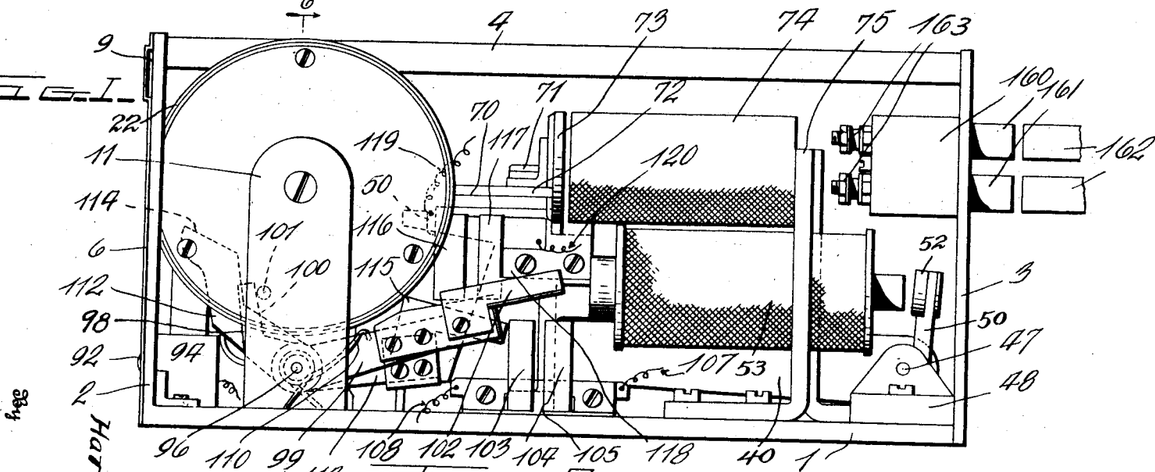
Figure 1 is an elevation from the right side of the machine with parts removed—
Figure 2:
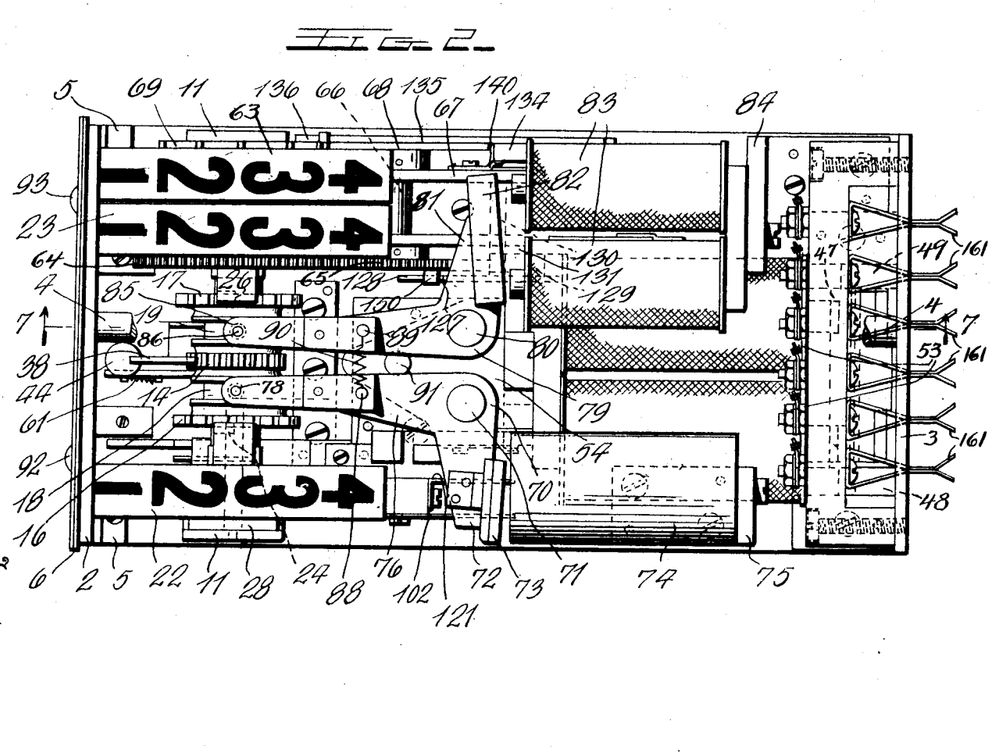
Figure 2 is a plan—
Figure 3:
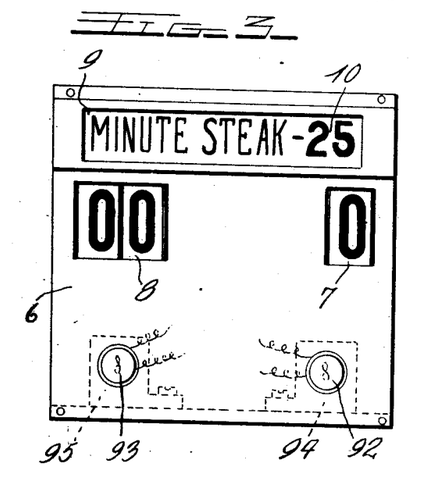
Figure 3 is a front elevation—
Figure 4:
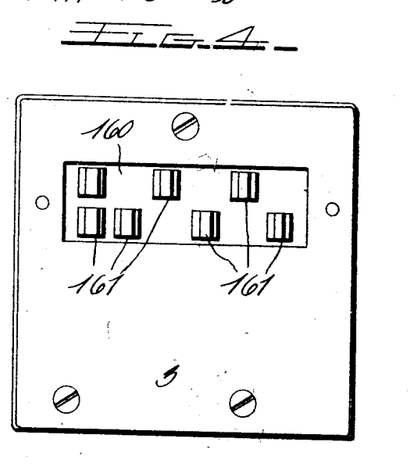
Figure 4 is a rear elevation—
Figure 7:
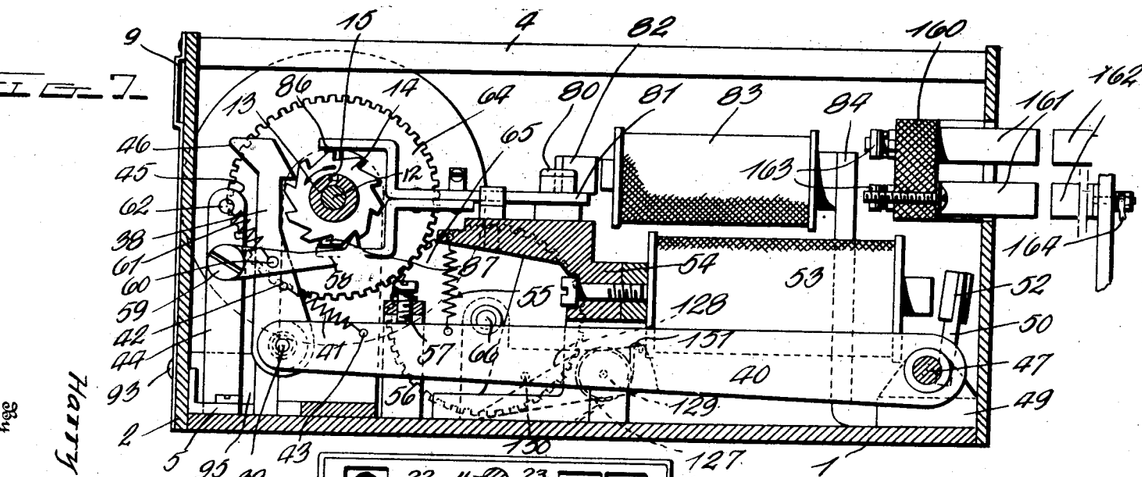
Figure 7 is a sectional elevation on line 7—7 of Figure 2 with parts removed—
Figure 8:
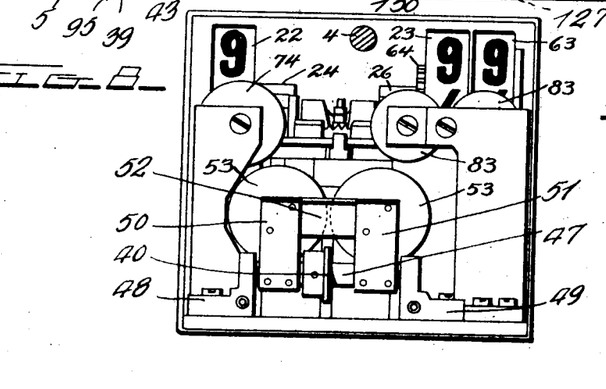
Figure 8 is an elevation with rear plate and other parts removed—
Figure 9:
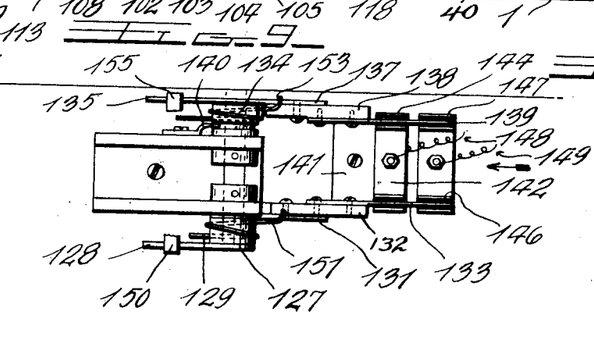
Figure 9 is a detail in plan with a portion broken away showing the switches employed—
Figure 10:
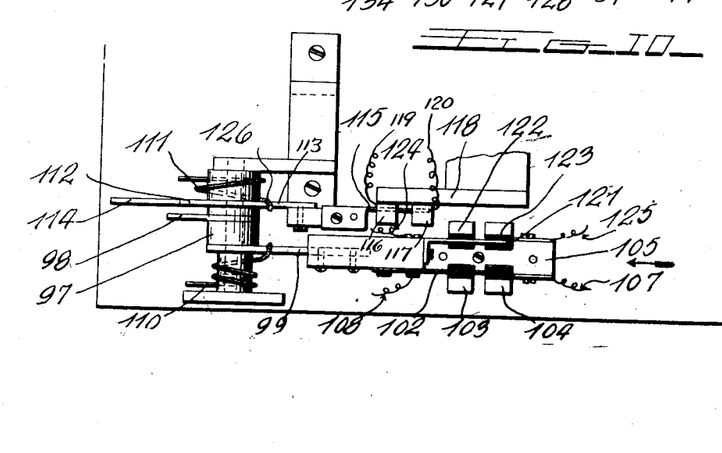
Figure 10 is a similar view looking at other parts—
Figure 11:
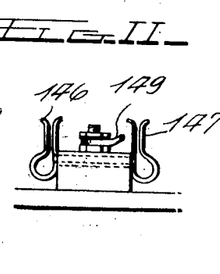
Figure 11 is an end view of Figure 9 looking in the direction of the arrow—
Figure 12:
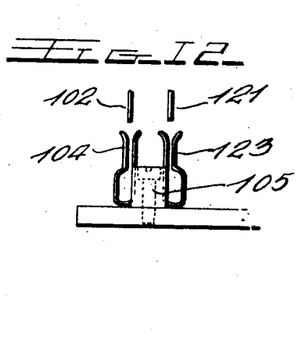
Figure 12 is an end view of Figure 10 looking in the direction of the arrow—

Referring now to the embodied form of means for actuating the toothed wheel 14, which registers the transactions on both the numbered drums 22 and 23, a pawl 38, freely mounted on the stud 39 fixed to the arm 40, is so placed and adapted as to co-act with the wheel 14 to advance it in direction of the arrow on Figure 7, one division successively, such division corresponding to the space of one digit on the drums 22 and 23. It will be understood that the pawl 38 receives its impulse from the arm 40, and returns to its normal position after such feeding movement.

One end of a spring 41 is attached to pin 42 fixed in the pawl 38, and the other end attached to the pin 43 fixed in the arm 40, and is so adapted as to keep the pawl 38 in engagement with the wheel 14.

A stud 44, fixed in the base 1 has its face 45, adjacent to the face 46 of the pawl 38, adapted for co-acting with the latter so as to lock the same in advanced position, thus tending to prevent overthrow and insuring an angular motion of the wheel 14 equivalent to one tooth or division of the wheel and of the drums 22 and 23.

The end of the arm 40 opposed to that carrying the pawl 38 is fixed on the shaft 47 which latter is rotatably mounted in brackets 48 and 49 fixed on the base 1. Arms 50 and 51 also fixed on the shaft 47 support an armature 52 arranged operatively adjacent to an electro-magnet 53 and adapted to be controlled thereby. The magnet 53 is mounted on a bracket 54 fixed to the base 1.

A spring 55 having one end attached to the arm 40 and the other end to bracket 54 acts to restore the arm 40 to normal position after being partially rotated by the electro-magnet 53. When the present device is operated with the controller of my said copending application Ser. No. 283,817, each actuation of said controller would produce a double registration in the machine of the present invention.

Embracing the arm 40 and fixed to the base 1 is a bracket 56 which carries an adjustable stop 57 arranged to act as a stop for the arm 40 against action of the spring 55.

A pawl 58 freely mounted on a stud 59 fixed to the stud 44 is suitably arranged to co-act with the wheel 14 to prevent its return after the latter has been advanced under action of the pawl 38. A pin 60, fixed to the pawl 58, carries one end of a spring 61, the other end of which is attached to a pin 62 mounted on the stud 44, the action of the spring 61 being to keep the pawl 58 in engagement with the toothed wheel 14.

The operation is as follows:

The energizing of the electro-magnet 53 attracts the armature 52 causing a partial rotation of the shaft 47 thus carrying the arm 40 through an angular distance sufficient to feed the wheel 14, by means of the pawl 38, one division, the pawl 58 retaining the wheel 14 in its advanced position, the springs 32 and 34 tending to return the sleeve 13 and its component parts. Through the co-action of the sleeve 13, the wheels 16 and 17, projections 24, 25, 26 and 27, the drums 22 and 23, are carried through an angular distance sufficient to bring into visible position the next digit on their peripheries, thus registering an addition of one to the previous reading. That is, when magnet 53 is operated from the controller of said application Ser. No. 283,817, an additional sale is registered against the supply source, which in a restaurant would be the cook or kitchen server.

Means are provided for registering an accumulation of items greater than that represented by the digits on a single drum. That is, the preceding mechanism shows only a single wheel or drum counting up to 9, the means now to be described provides a "tens" drum, counting up to 99. This could, of course, be duplicated to count any numbers, so far as desired. These consist of a second drum 63, adjacent to the drum 23, and mounted on the bushing 29 in a manner permitting free rotation. On the periphery of the drum 63 the ten digits, 0 to 9, inclusive, are arranged equally spaced and in alignment with corresponding numerals on drum 23.

A gear 64, centered on and fixed to a web of the drum 23, is in driving contact with a gear 65 fixed to a shaft 66, the latter rotatably mounted in bearings 67 fixed to the base 1. Also fixed to shaft 66 is a single toothed pinion 68 in driving and locking contact with a ten toothed gear 69 fixed to and centered on the web of the drum 63. The gear 69 is suitably arranged for intermittent partial rotation, one rotation of the pinion 68 driving the gear 69 and the drum 63 through an angular motion sufficient to feed one of the ten divisions into visible position.

It will be obvious that, with the gears 64 and 65 of substantially equal diameters, a complete rotation of the drum 23 will cause a complete rotation of the pinion 68 and a partial or one-tenth rotation of the drum 63. The drums 23 and 63 in combination for first rotation of the drum 23 shows digits from 1 to 9, the second rotation of the drum 23 will show from 10 to 19 and so forth.

In the embodied form of means whereby the source of commodity supply (which in the restaurant example, would be the cook or kitchen server) can step back or delete the registration of transactions, a bell-crank 70, rotatably mounted on a stud 71 fixed to the bracket 54 has one arm 72 suitably carrying an armature 73 adjacently placed to an electro-magnet 74, the latter mounted on a bracket 75 fixed to the base 1, said armature being under control of the magnet 74. The other arm 76 of the bell-crank 70 is yoke-shaped so as to embrace the groove 18 and has pins 77 and 78, which are fixed thereto, projecting into operative engagement with the groove 18.

In the means for stepping back or deleting the registration of transactions by the deposit of the commodity-demanding token, a bell-crank 79 is similarly arranged, being rotatably mounted on a stud 80 which is also fixed to the bracket 54 and has an arm 81 carrying an armature 82 adjacently placed to the electro-magnet 83 mounted on a bracket 84 which is fixed to the base 1. Armature 82 is under control of the electro-magnet 83.

The other arm 85 of the bell-crank 79 is yoke-shaped and embraces the groove 19; pins 86 and 87 fixed to arm 85 and project into operative engagement with the groove 19.

A pin 88 in the bell-crank 70, and a pin 89 in the bell-crank 79 each carry opposite ends of a spring 90 under tension. A pin 91 is fixed to bracket 54 and extends upwardly between the arms 76 and 85 of the bell-cranks 70 and 79, and serves as a stop for the bell-cranks against the tension of the spring 90.

Energizing the electro-magnet 74, through attraction of the armature 73, imparts to the bell-crank 70 partial rotation which serves to carry the toothed wheel 16 in the direction of the drum 22 and throws the projection 24 out of engagement with a tooth of 16 and the projection 25 in the path of a tooth of wheel 16. The release of the projection 24 permits the drum 22, under action of the spring 32, to step back a distance governed by the relative positions of the projections 24 and 25 and the teeth of the wheel 16, and which distance is one division, that is, one digit space on the drum 22. De-energizing the electro-magnet 74 permits the bell-crank 70, under action of the spring 90 to return to normal position and which return carries the wheel 16 out of engagement with the projection 25 and into engagement with the projection 24, the spring 32 carrying the drum 22 backwardly the remaining part of the single division on drum and thus presenting a number one less than that previously registered, the projection 25 acting to stop rotation of drum 22. It will be obvious that with the projections 24 and 25 properly positioned, a positive step-back action will be performed by the drum 22 insuring but a single division movement with each cycle of operation of the electro-magnet 74.

Similarly, the drum 23 performs, under action of the magnet 83 the armature 82, the bell-crank 79, the toothed wheel 17, and the projections 26 and 27 with cooperation of the spring 34. Under certain conditions the drum 63 is carried in direction the same as and under control of the drum 23, that is, the drum 63 will be stepped back one-tenth of a revolution for each revolution of drum 23. In the embodied form of registering and of stepping back or deletion mechanisms herein described and shown, and referring for example to only one of said mechanisms (see especially Figs. 6 and 13), the tooth 26 on drum 23 projects radially and inwardly into the path of the teeth on wheel 17 and rests against a face, say 17$^a$. In this position magnet 53 through wheel 14 will, when energized, rotate drum 23 in the direction of the arrow in Fig. 13 to register or count up successive additional transactions on the drum.

Figure 13:
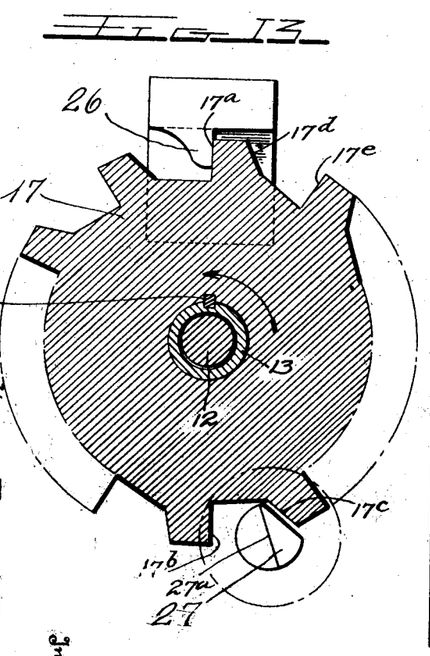
Figure 13 is an enlarged detail in vertical cross section as on the line 13—13 of Figure 6, looking in the direction of the arrow—

With reference to the stepping back or deletion structure and operation, when the parts are in the position of Fig. 13, magnet 83 is deenergized. Tooth or projection 27 (Figs. 6 and 13) projects in an axial direction toward, and passes between the teeth of wheel 17 in the position of Fig. 13, when the wheel is moved to the left in Fig. 6 and just before it passes out of engagement with tooth 26.

The teeth 26 and 27 are angularly spaced apart just sufficient to permit an escapement or rotational movement of one tooth space as the wheel 17 makes the to and fro movement on shaft 12, due to the energizing and deenergizing of magnet 83.

In Fig. 13, tooth 26 engages the tooth face 17$^a$ and holds drum 23 against the unwinding action of spring 34, which acts in the opposite direction to the arrow in Fig. 13. At this time tooth 27 is out of engaging position with respect to wheel 17. When magnet 83 is energized and by the intervening connections (as later described) moves the wheel 17 to the left in Fig. 6, just before the face 17$^a$ leaves tooth 26, tooth 27 has passed between the tooth faces 17$^b$ and 17$^c$ (Fig. 13). Just as wheel 17 leaves tooth 26, drum 23 and therewith teeth 26 and 27 move in a clockwise direction in Fig. 13 until the face 27$^a$ of tooth 27 strikes the tooth face 17$^b$. This movement brings tooth 26 into axial alinement between the tooth faces 17$^d$ and 17$^e$, but separated from wheel 17 and to the right thereof. When wheel 17 is moved again to the right by the deenergizing of magnet 83, it passes into alinement with tooth 26 before it leaves tooth 27. Just as it leaves tooth 27, spring 34 impels drum 23 in clockwise direction until tooth 26 engages tooth face 17$^e$. The foregoing effects angular relative movement of wheel 17 and drum 23 equal to one tooth space on the wheel and equal to one digit on the drum, and would by the consequent back-stepping of drum 23 effect the deletion of one transaction from the registration on the drum.

The corresponding mechanism for the drum 22 on the other side of the machine may be the same as the foregoing, and does not need to be separately described.

Obviously these step-back actions may take place independently of each other and of the advance under action of the magnet 53, the arm 40, the pawl 38 and the toothed wheel 14, or any two or the three may occur simultaneously.

For the purpose of attracting attention to the performance of the drums and as a visual indicating means of whether or not a registration is stored in the drums there are provided the lamps 92 and 93 mounted in sockets, held in the blocks 94 and 95 respectively, and preferably insulated from the base 1 and fixed thereto. That is, lamp 92 is lighted when drum 22 starts from zero and is turned off when the drum returns to zero. Lamp 93 is lighted when drum 23 starts from zero and remains lighted while there is a record of transactions on drums 23 and 63, going out when these drums are returned to zero.

Freely mounted on a rod 96 supported in the brackets 11 and 56 is a hub 97 having fixed thereto a lever having the arms 98 and 99. An arm 98 has the face 100 suitably arranged to co-act with pin 101 fixed to the drum 22. An arm 99 has fixed thereto and insulated preferably therefrom a blade 102. Prongs 103 and 104 are mounted in a block 105 fixed to the base 1 and so arranged as to be electrically insulated from each other and the base 1. Wires 108 and 107 are connected with prongs 103, 104 and the lamp 92 and a source of electrical energy so that when the blade 102 makes electrical contact with both the prongs 103 and 104 the circuit is closed and the lamp 92 illuminates. A spring 110 tends to move the arm 99 so as to make and hold contact with the prongs 103 and 104. It is obvious that a movement in advance of the drum 22 will carry the pin 101 away from the arm 98 permitting the arm 99 to carry the blade 102 in a direction to make contact with the prongs 104 and 103, lighting the lamp to indicate that a numeral is visible through the opening 7. The lamp 92 will so remain lighted until the return of the drum 22 to initial position indicating zero when the arm 97 is returned to normal and blade 102 withdrawn and the circuit opened.

In connection with the means for stepping back the drum 22 at the will of the attendant (such as the chef), mechanism is provided for preventing the drum stepping back beyond the zero point. As embodied, this comprises devices for opening the circuit of magnet 74 when drum 22 reaches zero in its backward movement and for closing the circuit at this particular point when the drum 22 is again advanced from zero by the controller mechanism. As embodied, arm 99 has another blade 121 insulated from and attached thereto. Prongs 122 and 123 are mounted on the block 105 and insulated from each other and the prongs 103 and 104. Wires 124 and 125 attached to the prongs 122 and 123 independently, are in circuit with the electromagnet 74 and a source of energy. It is obvious that with the prongs 122 and 123 so arranged as to be electrically connected when the arm 99 carries the blade 121 to make contact with said prongs, and disconnected when the arm 99 carries the blade 121 away therefrom, the pin 101 will control one circuit for the electro-magnet 74. Thus, when drum 22 is at zero position, pin 101 will move lever 98—99 to break the circuit of magnet 74, and when drum 22 is stepped ahead, lever 98—99 again makes the circuit of the magnet at 122 and 123. The push button or other device for voluntarily stepping back drum 22 (see 204, 205 in Fig. 14) is in circuit with terminals 122 and 123, and can back step drum 22 only when the circuit is closed at 122—123.

Means are also provided for preventing drum 22 stepping forward beyond the digit 9. In accordance with one feature of the invention, this is effected by causing the stepping back mechanism to operate automatically simultaneously with a stepping forward feed by the controller. As embodied, the hub 111 also freely mounted on the rod 96 carries, fixed thereto, a lever having the arms 112 and 113. The arm 112 has its face 114 operatively placed so as to co-act with the pin 101 for action hereinafter described. The arm 113 has mounted thereon and fixed thereto and insulated therefrom the blade 115, operatively adjacent to the prongs 116 and 117, mounted on the insulated block 118 fixed to the bracket 54. Wires 119 and 120 are electrically connected with the prongs 116 and 117 respectively and with a source of energy and the electro-magnet 74 is also arranged in the circuit by means of the said wires 119 and 120. During the advance and return of the drum 22 from 0 to 9 the blade 115 is not in contact with the prongs 116 and 117 thus keeping this circuit open and permitting operation of the electro-magnet 74 when desired through other circuit.

At the forward limit of the advance of the drum 22, pin 101 engages the arm 112 by contact with the face 114 closing circuit by engaging the blade 115 and the prongs 116 and 117, this causing operation of the electromagnet 74 and obviously stepping back the drum 22 from this position. It will be obvious that this is for the purpose of preventing a complete rotation of the drum 22. The spring 126 is arranged to keep the arm 113 in position with the blade 115 free from the prongs 116 and 117, the pin 101 acting against the tension of the spring 126 at a certain time in rotation of the drum 22.

Thus, when the drum 22 registers "9", or other forward limit, pin 101 will move lever 112—113 to make the circuit of magnet 74 at 116—117. This movement occurs at the beginning of the forward movement of the drum 22 and thus causes an operation of the stepping back mechanism of drum 22 simultaneously with the stepping forward feed of the drum. As a result, drum 22 has some forward movement, but will present the same visible number, but the drum 23, which is not under the control of the supply station (as for instance, the chef) will be stepped ahead and register the transaction unaffected by the action of drum 22. Thus the drum or drums 22 can be controlled at the supply station independently of the drum 23, which automatically registers all sale transactions and can be stepped back only by the deposit of the commodity-demanding token.

The switch and circuit mechanism 103—110 for so controlling lamp 92 has already been described.

For the purpose of lighting the lamp 93 when the drum 23 is advanced, the arm 127 with the face 128 is fixed to the hub 129 freely mounted on a rod 130 fixed in the bracket 67. Also fixed to this hub 129 is an arm 131 which carries as a part thereof an insulating block 132 on which is fixed the metal blade 133.

Also freely mounted on the rod 130 is a hub 134 to which is affixed an arm 135 with a face 136 and an arm 137 which has fast thereto the insulating plate 138 carrying the metal blade 139. The hub 134 is grooved so that a piece 140 fixed to the bracket 67 co-acts therewith to retain the hub 134 in operative alignment.

A block 141 fixed to the base 1 has a contact piece 142 with prongs 143 and 144 and a piece 145 with prongs 146 and 147 mounted thereon and electrically separated one from the other. The prongs 143 and 146 are adapted for co-action with the blade 133 for closing circuit made by the wires 148 and 149, the lamp 93 and a source of energy.

The prongs 144 and 147 are adapted to co-act with the blade 139 for the same purpose. Either of said blades may independently or simultaneously close the circuit. A pin 150 fixed in the gear 65 is adapted, when in contact with the face 128 of the arm 127, to hold the blade 133 out of engagement with the prongs 143 and 146. When in this position the drum 23 presents digit 0 through the slot 8 of the plate 6. Advance of the drum 23 to its next position carries the pin 150 out of engagement with the face 128 and permits contact of the blade 133 and the prongs 143 and 146. The spring 151 tends to drive the arm 131 and its blade 133 into contact with the prongs 143 and 146.

Similarly, the pin 152 fixed in the drum 63 co-acts with the face 136 of the arm 135 to control the blade 139 for making and keeping circuit through the prongs 144 and 147. The spring 153 tends to drive the arm 137 and its blade 139 into contact with the prongs 144 and 147.

It will be obvious that the double contact of blades 133 and 139 is for the purpose of keeping the lamp 93 lighted when the drum 23 has completed one or more rotations in succession and resting in 0 position, at which point the blade 133 is withdrawn out of position of contact with the prongs 143 and 146.

Under such conditions the pin 152 has been carried away from the arm 135 and thus permitting the blade 139 to make and keep contact with the prongs 144 and 147 and thereby keeping the circuit closed.

A block 160 of insulating material preferably, is mounted on the rear plate 3 and carries the prongs 161 adapted to be engaged with the corresponding blades 162, said blades being connected by wires or other means for leading from sources of controlling mechanisms and energy for operating the means described herein. Binding posts 163, connected with the prongs 161 are adapted for connecting wires of the various circuits. For similar purposes binding posts 164 connect with the blades 162.

Figure 14:
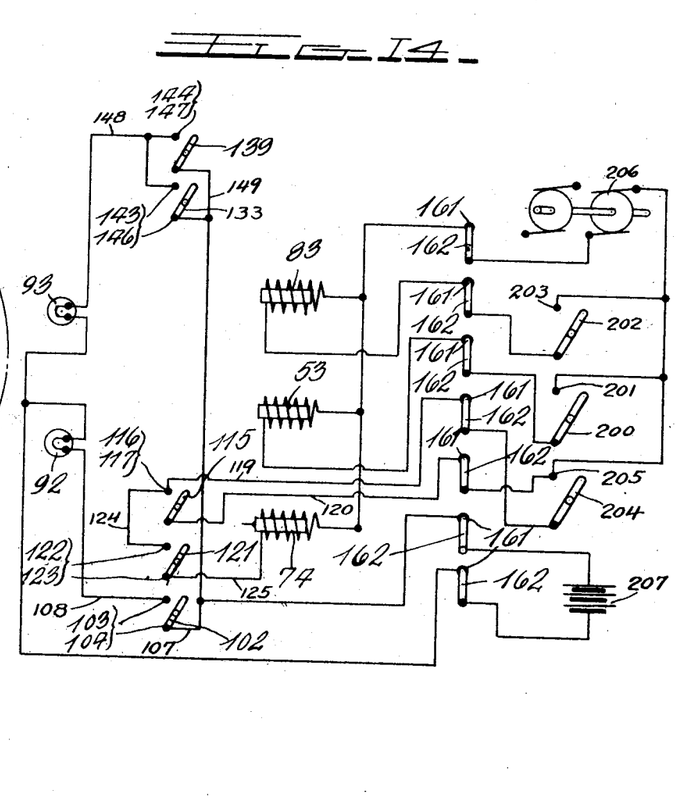
Figure 14 is a diagrammatic view illustrating electrical circuit.

In Fig. 14, the switch 200—201 represents the controlling machine, such as that of my copending application Ser. No. 283,817, already referred to. This switch energizes the circuit of magnet 53, and thereby registers the transaction on both drums 22 and 23 whenever a commodity-demanding token is uttered from the machine of application Ser. No. 283,817, with the attendant making of records which are inaccessible except to the managing or auditing authority.

Switch 202—203 represents the device or circuit control operated by the deposit of the commodity-demanding token uttered from the controller of application Ser. No. 283,817. So far as the broad aspects of the present invention is concerned, this mechanism in its details may be of any standard or suitable form of token-controlled or actuated mechanism. This steps back drum 23, or drums 23 and 63, to remove the charge for a commodity unit from against the supplier or supply source, but on the other hand, to effect this has required the deposit of the commodity-demanding token against both the seller and the supplier (such as the waiter and cook) and makes an agreement with the record made inaccessibly within the controller of application Ser. No. 283,817.

Switch 204—205 represents any kind of device operable at will by the supplier or supply station to step back the drum 22. An example of its use would be where a cook used the drum 22 to keep a record of how many orders he has to prepare. In this case, he would step back drum 22 as he noted the orders, and a subsequent reading would then represent to him the orders received since and yet to be prepared.

206 represents any suitable source of energy for the circuits for the switches just described. The supply source for the lights 92 and 93 is designated as 207.

The remaining reference numerals on Fig. 14 have been used in connection with the preceding description of the mechanism, and will be understood therefrom without further explanation.

Figure 15:
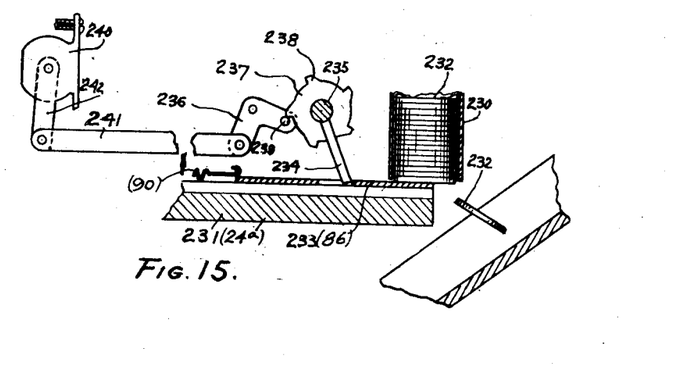
Fig. 15 is a fragmentary detail view of the token issuing and registering means.

In Fig. 15 is shown fragmentarily the token ejecting and recording or registering, referred to herein broadly in connection with my prior and copending application Ser. No. 283,817. A tube 230 is mounted on the base 231 of the machine and contains a plurality of tokens 232, each bearing a designating character or mark associating it with the particular unit with which it is employed.

A slide 233 is adapted, when driven by pin 234 fast on shaft 235, to cause the ejection of a token for each partial rotation of the shaft 235 which occurs at each actuation of the machine.

A bell crank lever 236 is adapted to be rocked by star wheel 237, fast on shaft 235, through the coaction of tooth 238 and a pin 239, fixed on the adjacent arm of the bell-crank lever.

This same partial rotation of the shaft 235 causes the register 240 through link 241 and arm 242 to register the ordered commodity represented by the unit controller, one for each actuation of the machine and an ejected token.

Figure 16:
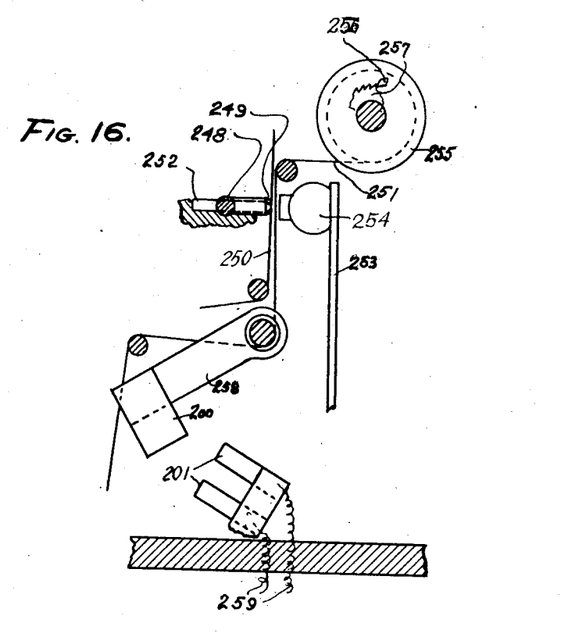
Fig. 16 is a fragmentary detail view of the recording means.

In Fig. 16 is shown means for the recordation of the commodity sale and the identity of the seller, and also the means for operating the registering means in the present embodiment of the invention. These are likewise taken from my said copending application Ser. No. 283,817.

A key 248 bearing preferably a raised character 249 representing the seller, is used to actuate the machine, the partial rotation presenting the character 249 operatively both to a carbon strip 250 and the audit strip 251. Also adjustably carried in the machine is a slug 252, bearing on an edge thereof printing characters representing the unit commodity.

An arm 253 carries a platform 254 on its free end and adapted, when actuated, to impinge one face of the carbon strip 250 against the key character and the printing face of the slug, the audit strip being pressed against the opposed side of the carbon strip, and thus impressing on this audit strip both the seller's designation and that of the commodity. Thereby the record charge is made against the seller.

A spool 255 carries the audit strip 251 and is adapted to feed it by means of the pawl 256 cooperating with the ratchet 257. An arm 258 carries at its free end an insulated switch block 200 adapted to cooperate with knife switch 201 to close a circuit 259 for each actuation of the machine. These wires are in the circuit controlling the magnet 53, and the latter will be energized for each contact of the block 200 with the blades of the knife switch 201. The charge is thus made against the delivery station for each commodity sale.

Modifications in detail may be resorted to without departing from the spirit of the invention or sacrificing any of its advantages.

What is claimed as new is:

1. In a commodity sale registering machine operable by a controller, in combination, mechanism operated by said controller for registering within the machine a commodity sale and issuing a token, and means operated by the deposit of the token issued by said controller in registering the sale for deleting said registration within said sale registering machine.

2. As a unit in an automatic commodity sale accounting system together with a separated commodity sale controller, a commodity sale registering machine including in combination sale registering mechanism automatically operated by the recording of the sale in said controller, and means operated by the deposit of a token issued by said controller in recording the sale for deleting the registration in the registering machine.

3. As a unit in an automatic commodity sale accounting system together with a separated commodity sale controller, a commodity sale registering machine including in combination sale registering means, connections therefrom to said controller whereby the recording of a sale in the controller operates said sale registering means to register said sale, and means operated by the deposit of a token issued by said controller in recording the sale for deleting the registration of said sale in the registering means.

4. A commodity sale registering machine operable by an external controller, and including in combination mechanism operated by said controller for registering within the machine a commodity sale, and means operated by the deposit of a token issued by said controller in registering the sale for deleting said register within said sale registering machine, said registering mechanism and deleting means being capable of simultaneous operation.

5. As a unit in an automatic commodity sale accounting system together with a separated commodity sale controller, a commodity sale registering machine including in combination sale registering mechanism automatically operated by the recording of the sale in said controller, and means operated by the deposit of a token issued by said controller in recording the sale for deleting the registration in the registering machine, said registering mechanism and deleting means being capable of simultaneous operation.

6. As a unit in an automatic commodity sale accounting system together with a separated commodity sale controller, a commodity sale registering machine including in combination sale registering means, connections therefrom to said controller whereby the recording of a sale in the controller operates said sale registering means to register said sale, and means operated by the deposit of a token issued by said controller in recording the sale for deleting the registration of said sale in the registering means, said registering mechanism being operable by the controller simultaneously with the operation of said deleting means by a token previously issued by said controller.

7. As a unit in an automatic commodity sale accounting system together with a separated commodity sale controller, a commodity sale registering machine including in combination a sale registering device, means for advancing said device step by step to register successive sales, and means for stepping back said device a step by the deposit of a token issued by said controller in registering the sale.

8. As a unit in an automatic commodity sale accounting system together with a separated commodity sale controller, a commodity sale registering machine including in combination a sale registering device, means operated automatically by the recording of a sale in said controller for advancing said device step by step to register successive sales, and means for stepping back said device a step by the deposit of a token issued by said controller in recording the sale.

9. As units in an automatic commodity sale accounting system a sale controller mechanism having commodity demanding token and sale recording devices at a selling station, a sale registering mechanism at a supply station automatically operated by the recording of a sale by said recording devices of the sale controller mechanism and having means for deleting the registration of sale operated by the deposit of said token.

10. An automatically operating accounting machine for a commodity supply station including in combination means at a selling station for issuing a token and recording said issuance, mechanism operated by the token issuing means for registering a commodity sale at the supply station and means operated by the deposit of a sale-identifying token issued and recorded at the selling station for deleting the registration of said sale.

11. As units in an automatic commodity sale accounting system a sale controller mechanism having attendant operated sale recording devices at a selling station, a register at a supply station automatically operated by the recording of a sale by said recording devices of the sale controller mechanism, and means also operated by the recording of sales by said recording devices for making a continuous inaccessible registration of successive sales on said register at the supply station.

12. An automatically operating accounting machine for a commodity supply station including in combination mechanism operated by a seller to register a commodity sale and means operated by the deposite of a sale-identifying token recorded and issued to the seller to indicate the delivery of the commodity by the supply station, and means for making a continuous inaccessible registration at the supply station of successive sales and of the identity of the seller.

13. An automatically operating accounting machine for a commodity supply station including in combination a pair of registers, means for advancing one of the registers to register a commodity sale, means compelling corresponding advance of the other register, and means for retracting each register independently of the other, said advancing means and retracting means being capable of simultaneous operation.

Signed at New York city in the county of New York and State of New York this 17th day of February, A. D. 1921.

HARRY RUSSELL BRAND.